United States Patent [19]

Cheng

[11] Patent Number: 5,085,305
[45] Date of Patent: Feb. 4, 1992

[54] CAM-OPERATED, POSITIVE CLUTCH WITH ELECTROMAGNETIC ACTUATOR

[76] Inventor: Yen-Feng Cheng, c/o Hung Hsing Patent Service Center, P.O. Box 55-1670, Taipei (10477), Taiwan

[21] Appl. No.: 624,642
[22] Filed: Dec. 10, 1990
[51] Int. Cl.⁵ .................... F16D 11/10; F16D 27/00
[52] U.S. Cl. ................ 192/67 R; 192/84 R; 192/93 A
[58] Field of Search .............. 192/93 A, 108, 40, 24, 192/115, 67 R, 84 R

[56] References Cited

U.S. PATENT DOCUMENTS

| | | | |
|---|---|---|---|
| 1,047,801 | 12/1912 | Haney | 192/67 R |
| 2,384,582 | 9/1945 | Wildhaber | 192/108 |
| 2,384,583 | 9/1945 | Wildhaber | 192/108 X |
| 2,384,584 | 9/1945 | Wildhaber | 192/108 X |
| 2,497,893 | 2/1950 | Linahan | 192/110 R X |
| 2,621,045 | 12/1952 | Montooth | 192/93 A X |
| 3,285,378 | 11/1966 | Garrison et al. | 192/93 A X |
| 3,289,800 | 12/1966 | Strong | 192/93 A X |

FOREIGN PATENT DOCUMENTS

| | | | |
|---|---|---|---|
| 55717 | 5/1981 | Japan | 192/108 |
| 16981 | of 1912 | United Kingdom | 192/93 A |

Primary Examiner—Rodney H. Bonck

[57] ABSTRACT

A clutch includes two coupling members respectively secured or coupled to two transmission shafts and each coupling member having a plurality of coupling teeth formed with arcuate or round tip portions for a smooth engaging of the two coupling members, and an electromagnetic controller electromagnetically driving a thrusting cam in relation to a stationary cam mounted on a base housing of the clutch, so that the clutch can be coupled or uncoupled smoothly, instantly and lightly.

1 Claim, 3 Drawing Sheets

CAM-OPERATED, POSITIVE CLUTCH WITH ELECTROMAGNETIC ACTUATOR

BACKGROUND OF THE INVENTION

A conventional clutch such as a serrated coupling or a jaw coupling generally includes a plurality of interlocking teeth or jaws formed on their inner contact surfaces which can be engaged or disengaged for connecting or disconnecting two shaft portions. However, when it is intended to couple two coupling members of the clutch under running especially at high speed revolution, the teeth or jaws may be worn or damaged when closely contacted with each other. Meanwhile, such an engaging operation of the clutch coupling is always manually done by a liner sliding movement of the coupling members, possibly delaying a coupling operation and causing inconvenience for an operator.

The present inventor has found the drawbacks of the conventional clutch, and invented the present clutch which can be operated continuously during machine running.

SUMMARY OF THE INVENTION

The object of the present invention is to provide a clutch including two coupling members respectively secured or coupled to two transmission shafts and each coupling member having a plurality of coupling teeth formed with arcuate or round tip portions for a smooth engaging of the two coupling members, and an electromagnetic controller electromagnetically driving a thrusting cam in relation to a stationary cam mounted on a base housing of the clutch, so that the clutch can be coupled or uncoupled smoothly, instantly and lightly.

DETAILED DESCRIPTION

Figure 5:
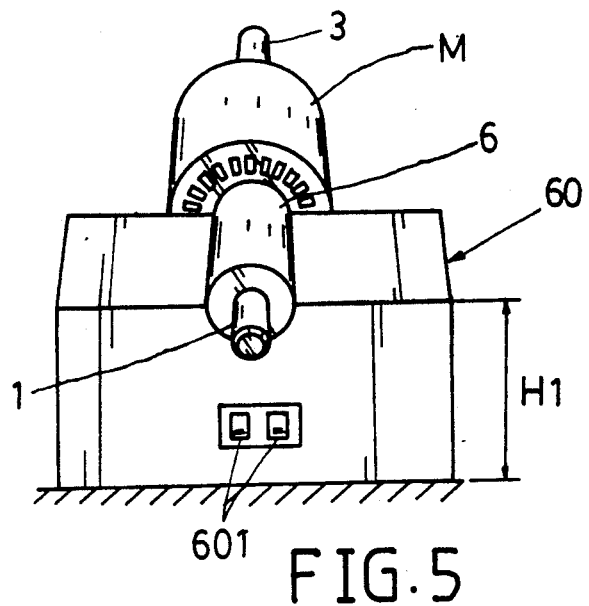
FIG. 5 shows a base housing for mounting the coupling members and shafts of the present invention.
Figure 6:
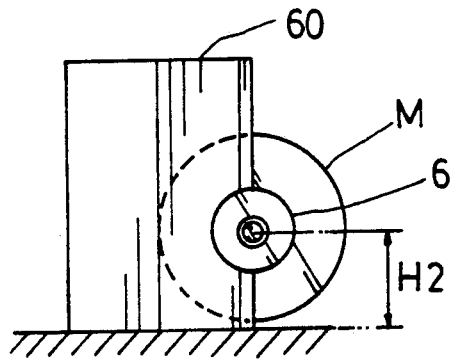
FIG. 6 shows another position of the housing in accordance with the present invention.
Figure 7:
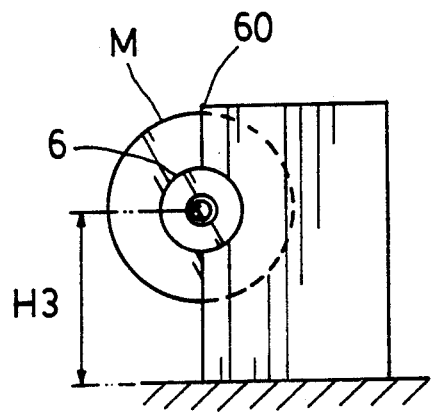
FIG. 7 shows still another position of the present invention.

As shown in FIGS. 1-4, the present invention comprises: a first transmission shaft 1, a first coupling member 2, a second transmission shaft 3, a second coupling member 4, a step bearing 5, a sleeve 6, a stationary cam 7, a thrusting cam 8, an electromagnetic controller 9, and a base housing 60 for mounting the clutch of the present invention. Either shaft 1 or 3 may be mounted to a driving mechanism such as a motor M as shown in FIGS. 5-7.

Figure 3:
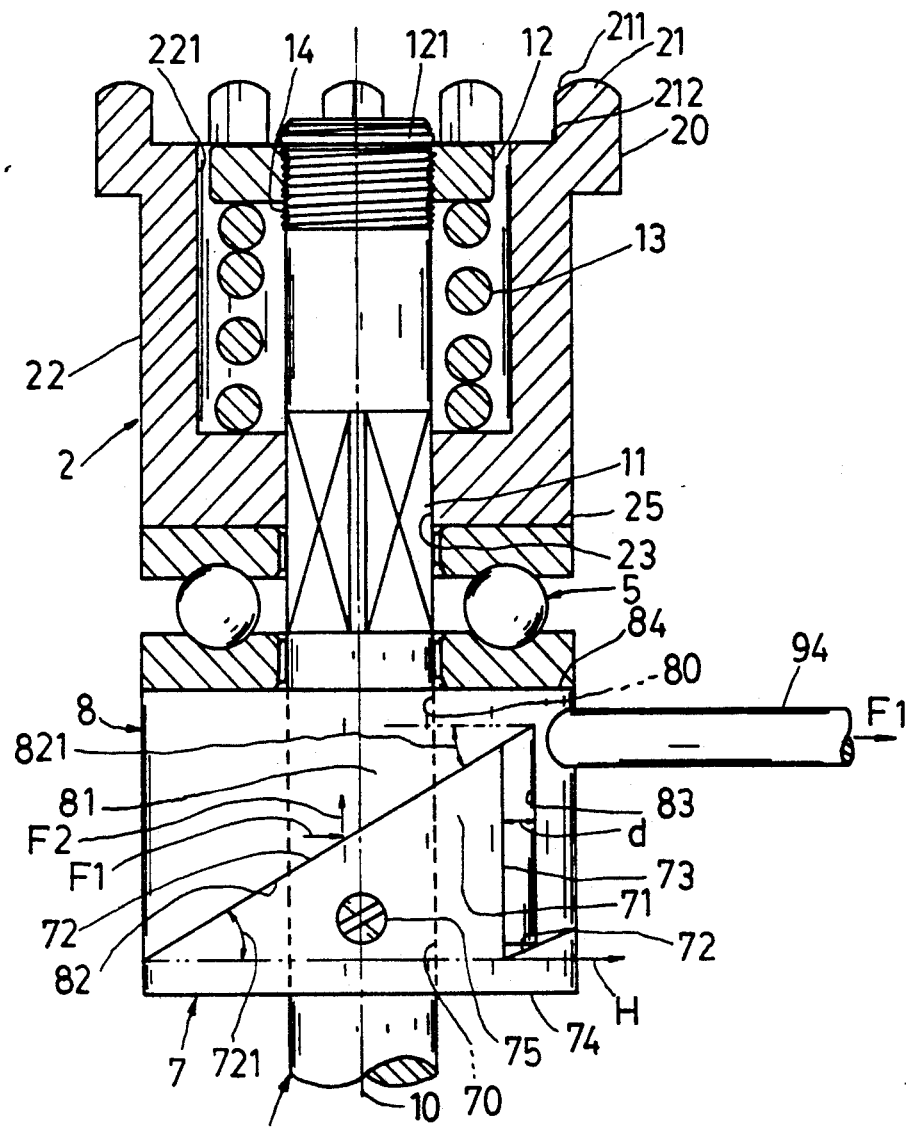
FIG. 3 is an illustration showing two cams and one coupling member of the present invention.

The first transmission shaft 1 includes a square spindle 11 formed on a middle portion of the shaft 1 for securing the first coupling member 2 thereon, a restoring spring 13 disposed around the shaft 1, and an adjusting nut 12 secured on an end portion of the shaft 1 for retaining the spring 13 by a retainer 121 as shown in FIG. 3.

The first coupling member 2 includes: a plurality of coupling teeth 21 annularly formed on a first contacting disk 20 formed on one end portion of a cylindrical body 22, a square hole 23 formed in a bottom portion 25 of the body 22 opposite to the disk 20, and a dry bearing 24 retained between the cylindrical body 22 and the sleeve 6. The square hole 23 is slidably engageable with the square spindle 11 of the first shaft 1. The spring 13 and nut 12 of the first shaft 1 is positioned in a cylindrical socket 221 defined within the body 22.

The coupling teeth 21 include a plurality of male extension teeth 211 each tooth 211 having an arcuate or round tip portion and a plurality of rectangular recesses 212 each recess 212 recessed between every two neighbouring teeth 211. Each tooth 211 has a width equal to a width of each recess 212. A height of each tooth 211 equals to a depth of each recess 212.

The restoring spring 13 is retained between the nut 12 and the bottom portion 25 of the cylindrical body 22. The nut 12 is adjustably fixed on a male-threaded portion 14 formed on the end portion of the shaft 1 as shown in FIG. 3.

The second coupling member 4 includes a plurality of coupling teeth 41 radially formed on a second contacting disk 40 secured on one end of the second transmission shaft 3. The coupling teeth 41 include a plurality of male extension teeth 411 each having an arcuate or round tip portion and a plurality of rectangular recesses 412 each recessed between every two neighbouring teeth 411. The teeth 411 and recesses 412 are respectively engageable with the teeth 211 and recesses 212 of the first coupling member 2.

The step bearing 5 is rotatably retained between the cylindrical body 22 and the thrusting cam 8.

Figure 1:
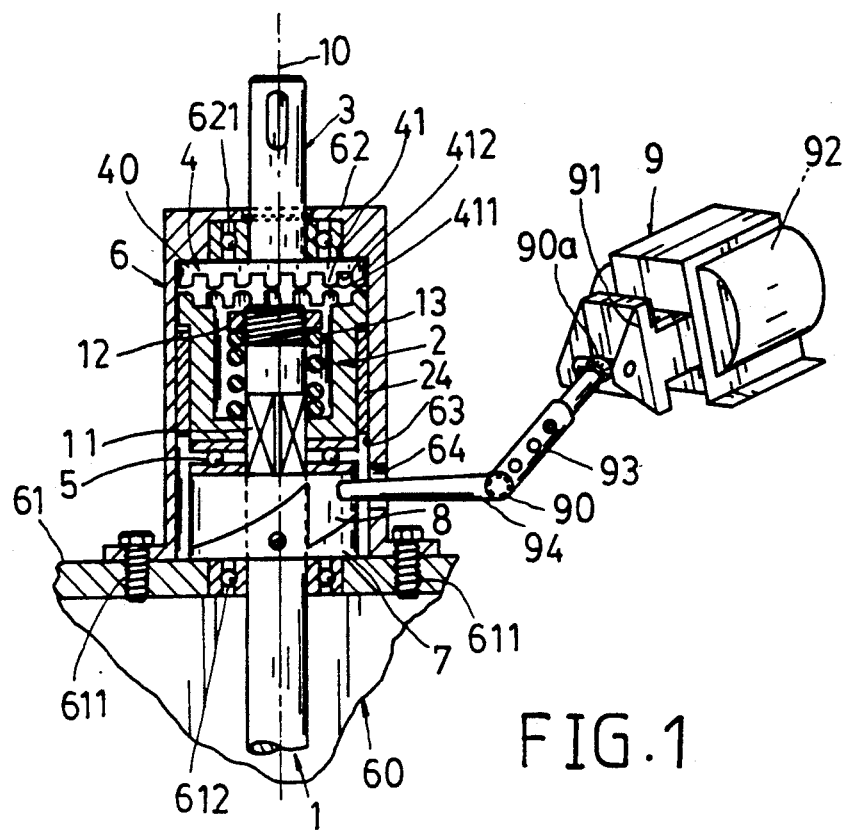
FIG. 1 is an illustration showing a clutch uncoupled in accordance with the present invention.

The sleeve 6 includes: a fixing plate 61 mounted on the base housing 60 by screws 611 having a bearing 612 formed in the fixing plate 61 for rotatably mounting the first shaft 1, an end plate 62 opposite to the fixing plate 61 having the other bearing 621 formed in the plate 62 for rotatably mounting the second shaft 3 thereon, a cylindrical hole 63 for rotatably receiving the two coupling members 2, 4 and the two cams 7, 8 in the hole 63, and a slot 64 formed in a side portion of the sleeve 6 for passing an actuating rod 94 of the electromagnetic controller 9 as shown in FIG. 1.

The shafts 1, 3 of the present invention may be optionally mounted on the base housing 60 to obtain several heights, such as: H1, H2 and H3 respectively shown in FIGS. 5, 6 and 7. The base housing 60 may be a polygonal shape.

The stationary cam 7 includes: a central hole 70 for rotatably mounting the first shaft 1 therein, a plurality of first ratchet teeth 71 (preferably two teeth 71) circumferentially formed on the cam 7, a base shoulder portion 74 adjacent to the fixing plate 61 of the housing 60, and a fixing screw 75 for securing the cam 7 in the sleeve 6.

Each first ratchet tooth 71 includes a first sloping surface 72 inclinedly formed on the cam 7 around a longitudinal axis 10 of the shaft 1 aligned with the shaft 3 (shaft 1 has a common axis 10 coaxial with that of shaft 3) and sloping upwardly rightwardly as shown in FIG. 3, and a first vertical surface 73 paralle to the axis 10 intersecting two adjacent sloping surfaces 72 of two neighbouring teeth 71.

The thrusting cam 8 includes: a central hole 80 for rotatably mounting the first shaft 1, a plurality of second ratchet teeth 81 circumferentially formed on the cam 8, and a base shoulder portion 84 adjacent to the step bearing 5 rotatably urging the bottom portion 25 of the first coupling member 2.

Each second ratchet tooth 81 includes a second sloping surface 82 inclinedly formed on the cam 8 around the axis 10 and sloping downwardly leftwardly to be tangentially engageable with the first sloping surface 72 of the cam 7, and a second vertical surface 83 parallel to the first vertical surface 73 intersecting two adjacent sloping surface 82 of two neighbouring teeth 81. Either sloping surface 72 or 82 has an acute angle 721 from a horizontal line or plane (H) as shown in FIG. 3.

The electromagnetic controller 9 includes: a core latch 91 electromagnetically attracted by a coil 92 wound around the latch 91, an adjusting rod 93 of which a rod length can be adjusted such as by telescopic means or other suitable means pivotally secured to the latch 91 by a universal joint 90a, and an actuating rod 94 having an outer end secured to a circumferential surface of the cam 8 and having an inner end pivotally secured to the rod 93 by a universal joint 90. The controller 9 may be held in the housing 60 provided with control switches 601 as shown in FIG. 5.

Figure 2:
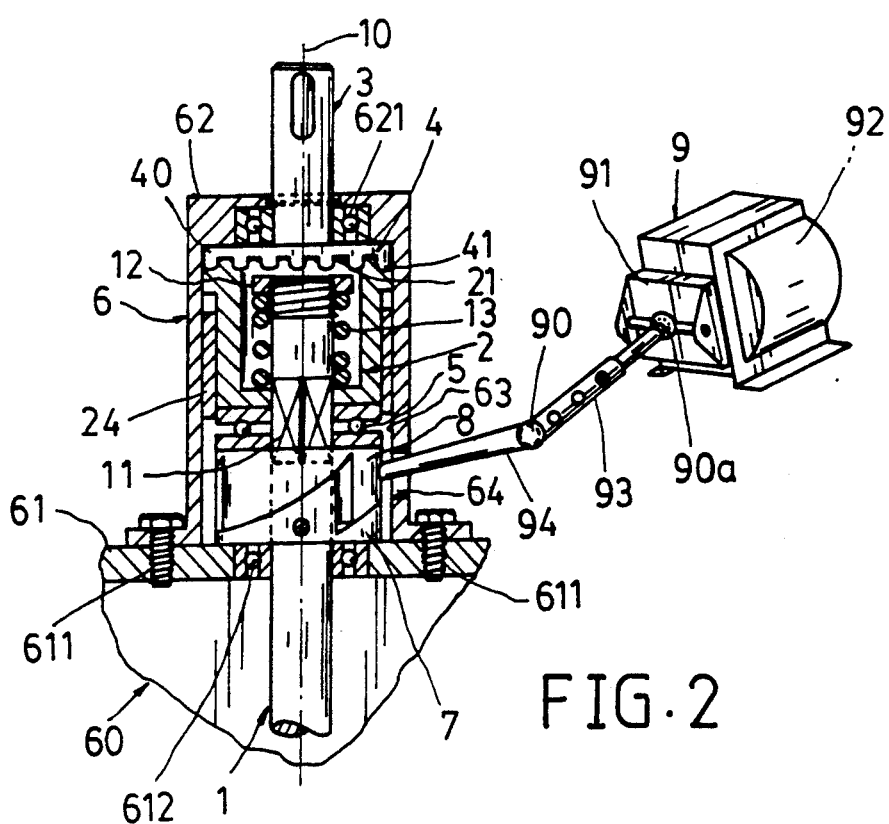
FIG. 2 shows a clutch of the present invention when coupled.
Figure 4:
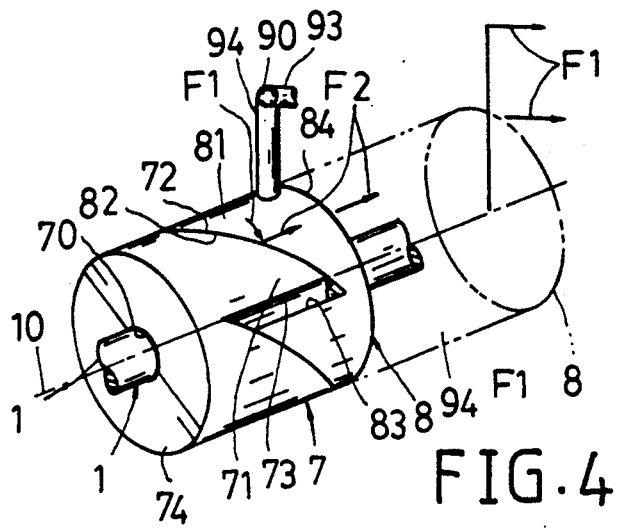
FIG. 4 is a perspective view of the two cams of the present invention.

In operating the present invention, the electromagnetic controller 9 can be switched on to electromagnetically attract the latch 91 inwardly to pull the rod 93 and rod 94 to rotate the cam 8 around the axis 10 in a rightward direction F1 as showns in FIGS. 3, 4 (producing an aperture between two vertical surfaces 73, 83 of the two cams) so that a thrust force F2 will be exerted as shown in FIGS. 4, 3 as the sloping surface 82 of cam 8 is urged by the sloping surface 72 of cam 7, thereby twistingly thrusting the cam 8 upwardly to extend or raise the first coupling member 2 towards the second coupling member 4 to engage the coupling teeth 21 with teeth 41 as shown in FIG. 2. The spring 13 is also compressed to store its resilience. Therefore, if an input force is applied to rotate the shaft 1, the shaft 2 will transmit an output force by the coupled members 2, 4.

When the controller 9 is switched off, the latch 91 will be restored by a restoring spring (not shown) formed in the controller 9 to extend the rod 93, 94 leftwardly to counter rotate the cam 8 to re-engage the cam 8 with cam 7 as shown in FIG. 1. Also, the restoring spring 13 on the shaft 1 will retract or lower the first coupling member 2 to disengage from the second coupling member 4 as shown in FIG. 1.

The present invention is superior to a conventional clutch with the following advantages:

1. Each coupling tooth 21, 41 is formed with arcuate round tip portion 211, 411 for a smooth engagement, especially adapted for coupling use in a continuous running of a rotating machine.

2. The electromagnetic controller 9 can be switched on or off for instantly coupling or uncoupling operation of the clutch.

3. The two cams 8, 7 serve as two leverage systems for saving force for a coupling operation. The pulling force F1 of the rod 94 secured to the circumferential surface of the cam 8 for pulling the cam 8 about the axis 10 acts as a first lever. The sloping surface 82 of the ratchet tooth 81 as thrusted by the sloping surface 72 of the ratchet tooth 71 acts as a second lever. Both levers will synergetically save the driving force for coupling the two members 2, 4, thereby causing a lighter load of the controller 9.

The electromagnetic controller 9 of this invention may be modified to other driving mechanism without departing from the spirit and scope of the present invention.

The restoring spring 13 and nut 12 of this invention may be set with a pre-determined strength for uncoupling the first coupling member 2 from the second coupling member 4, which nut 12 can be adjusted on the male-threaded end portion of the first shaft 1.

I claim:

1. A lever twisted and thrusted clutch comprising: a first coupling member having a plurality of first coupling teeth annularly formed on a first contacting disk of said first coupling member slidably secured on a first transmission shaft;

a second coupling member having a plurality of second coupling teeth annularly formed on a second contacting disk engageable with said first coupling teeth, and secured to a second transmission shaft;

a sleeve having a fixing plate secured to a base housing formed with a first bearing therein for rotatably mounting the first transmission shaft and an end plate opposite to said fixing plate formed with a second bearing therein for rotatably mounting the second transmission shaft, and having a cylindrical hole formed inside said sleeve for rotatably receiving both said coupling members in said sleeve;

a stationary cam fixed in said sleeve and having the first transmission shaft rotatably mounted therein; a thrusting cam having the first transmission shaft rotatably received therein and operatively thrusted by said stationary cam; and an electromagnetic controller operatively driving said thrusting cam in relation to said stationary cam for coupling both said coupling members for transmitting an output force from said first transmission shaft to said second transmission shaft or vice versa;

said stationary cam including a central hole engageable with said first shaft, a plurality of first ratchet teeth circumferentially formed on said stationary cam, and a fixing screw for fixing said stationary cam in said sleeve, each said first ratchet tooth including a first sloping surface inclinedly formed on said stationary cam around a longitudinal axis of said first shaft and sloping upwardly rightwardly with respect to a rightward attraction direction as attracted by said electromagnetic controller for vertically erecting said first shaft, and a first vertical surface parallel to said axis intersecting two adjacent said first sloping surfaces of two neighbouring said first ratchet teeth;

said thrusting cam including a second central hole engageable with said first shaft, and a plurality of second ratchet teeth circumferentially formed on said thrusting cam, each said second ratch tooth including a second sloping surface inclinedly formed thereon around said axis of said first shaft and sloping downwardly leftwardly in relation to said first sloping surface corresponding to the rightward attraction direction by said electromagnetic controller to be tangentially engageable with said first sloping surface of said stationary cam and a second vertical surface parallel to said first vertical surface intersecting two adjacent second sloping surfaces of two neighbouring said second ratchet teeth; and said electromagnetic controller including: a core latch electromagnetically attracted rightwardly by a coil wound therearound, an adjusting rod universally pivotally connected to said core latch, and an actuating rod universally pivotally connected to said adjusting rod having an outer end of said actuating rod secured to a circumferential surface of said thrusting cam by passing through a slot formed in said sleeve, said sleeve rotatably holding both said cams in said sleeve.

* * * * *